United States Patent Office 3,388,999
Patented June 18, 1968

3,388,999
AQUEOUS, SATURATED MONOGLYCERIDE
DISPERSION
Noel H. Kuhrt and Russell A. Broxholm, Rochester, N.Y., assignors to Eastman Kodak Company, Rochester, N.Y., a corporation of New Jersey
No Drawing. Filed June 11, 1964, Ser. No. 374,238
21 Claims. (Cl. 99—118)

ABSTRACT OF THE DISCLOSURE

An aqueous dispersion comprising a saturated monoglyceride and water, together with a quantity of lecithin sufficient to prolong the maximum activity condition of the monoglyceride. Additionally, the water may have an acid pH and the composition may include a small quantity of a mold inhibitor to prevent the growth of mold over a substantial period of time. Additionally, the composition may comprise a quantity of an unsaturated monoglyceride which creates an improved texture in baked goods; as well as a quantity of a triglyceride.

The invention also comprises a process for making the compositions by blending the ingredients together at a temperature above the melting temperature of the monoglyceride, and then cooling the blend. Separate oil and water phases can be blended, and then combined.

---

This invention relates to the chemical arts. More particularly, it relates to saturated monoglycerides.

Saturated monoglycerides, generic terminology applied to glyceryl monoesters of saturated, higher fatty acids, are normally solid (that is, generally solid at 20–25° C.) compounds which are particularly useful as emulsifying agents in bakery products. When incorporated into bread dough they establish and maintain a number of desirable characteristics in the resulting baked goods. For example, saturated monoglycerides tend to emulsify air and complex starch, thereby provide fine grain and thin cell walls to baked products such as bread and cake.

Saturated monoglycerides at 20–25° C. exhibit polymorphism. One polymorphic form or phase is referred to as the alpha phase. Another is referred to as the beta phase. The alpha phase is thermodynamically unstable and in a relatively short period of time saturated monoglycerides in this phase revert to the more stable beta phase. For this reason the saturated monoglyceride products of commerce have usually gone into the stable beta polymorphic crystalline phase by the time they are to be used.

Saturated monoglycerides, however, appear to be most effective in bread and the like when they are in the alpha crystalline phase. In this connection, saturated monoglycerides which are in the alpha crystalline phase are hereinafter referred to as saturated monoglycerides in a maximum activity condition.

Consequently, it is most desirable that saturated monoglycerides be in a maximum activity condition when incorporated into bread dough.

Aqueous dispersions of saturated monoglycerides are a preferred means of incorporating saturated monoglycerides and water into bread dough and the like. One way for making such dispersions has been to add the monoglycerides with stirring to water at a temperature of 140–150° F. and when a homogeneous dispersion is obtained, to cool the dispersion to room temperature. This procedure results in the saturated monoglycerides being in a maximum activity condition. However, the saturated monoglycerides rapidly revert to the beta phase. This occurs even more rapidly when an edible triglyceride material such as lard is present at a substantial concentration in the dispersion for the purpose of making the dispersion stable, that is, for maintaining the saturated monoglyceride particles in suspension. Consequently, in a number of instances it has been customary to make aqueous dispersions of saturated monoglycerides at the bakery and shortly before the time of use. This calls for equipment and personnel, and thereby results in both a capital investment and running expense, which most commercial bakeries would like to avoid. It would be desirable, therefore, for commercial suppliers of monoglycerides to be able to supply aqueous dispersions of saturated monoglycerides in a maximum activity condition. Such is not feasible, however, unless there can be made on a practical basis stable, aqueous dispersions of saturated monoglycerides in a maximum activity condition wherein the maximum activity condition is maintained for long periods of time under normally encountered storage conditions. Thus, there is posed a problem to which this invention provides a solution.

This invention is based upon the discovery that lecithin in aqueous dispersions of saturated monoglycerides in a maximum activity condition functions at relatively small concentrations to substantially prolong the maximum activity condition. Furthermore, it has been found that the presence of triglyceride material such as lard at substantial concentrations adversely affects this function of lecithin unless unsaturated monoglycerides at counteracting concentrations are also present.

In summary, this invention comprises an aqueous dispersion consisting essentially of a monoglyceride composition consisting essentially of a saturated monoglyceride product in a maximum activity condition, lecithin and water. Preferred embodiments of the aqueous dispersion of this invention include such other components as protein material and preservatives such as antioxidants, metal complexing agents and mold inhibitors. Other preferred embodiments include at least one unsaturated monoglyceride and triglyceride material.

A monoglyceride is a fatty acid monoester of glycerol wherein the fatty acid moiety generally comprises 8–22 carbon atoms and usually 14–20 carbon atoms. A fatty acid moiety having less than 8 carbon atoms is within the concepts of this invention, but the effectiveness of the corresponding monoglyceride in bread is not adequate at practical concentrations. A fatty acid moiety having more than 22 carbon atoms is within the concepts of this invention but because fatty acids of greater than 22 carbon atoms and the corresponding glycerides are not available on a commercial basis, 22 carbon atoms at the present time appear to be a practical upper limit. A saturated monoglyceride, as already indicated, is a fatty acid monoester of glycerol, wherein the fatty acid moiety is chemically saturated. A saturated monoglyceride product is one consisting of at least one saturated monoglyceride and having a total monoglyceride concentration of at least about 60% by weight, preferably at least about 90% by weight, and an iodine value [AOCS Official Method Cd 1–25 (rev. April 1956), Official and Tentative Methods of the American Oil Chemists Society, 2nd ed., additions and revisions 1947 through 1963, inclusive] generally in a range from 0 to about 5 and preferably less than about 1. An unsaturated monoglyceride is a fatty acid monoester of glycerol, wherein the fatty acid moiety is chemically unsaturated. An unsaturated monoglyceride product is one consisting essentially of at least one unsaturated monoglyceride and having a total monoglycerides concentration of at least about 60% by weight, preferably at least about 90% by weight, and an iodine value generally in a range from about 5 to about 75.

The monoglyceride products of this invention are made in accordance with well-known procedures. One such procedure is the direct esterification of one or more fatty acids with glycerol followed preferably by distillation to obtain a high purity product containing one or more monoglycerides at a concentration of at least about 60% by weight. Another such procedure is the glycerolysis of vegetable and animal oils, that is, the interesterification of glycerol with triglycerides such as those provided by lard, beef tallow, soybean oil, cottonseed oil, safflower oil and the like and hydrogenated fats and oils. Preferably, in the glycerolysis procedure, the resulting interesterification reaction mixture is subjected to thin film, vacuum distillation to distill off a high purity product consisting essentially of a mixture of monoglycerides. This latter procedure for the preparation of distilled, high purity monoglyceride products is disclosed in the U.S. patents, Nos. 2,634,234, 2,634,278 and 2,634,279, to Kuhrt. Such distilled monoglyceride products usually contain monoglycerides at a concentration of at least about 90% by weight.

A preferred saturated monoglyceride product is a distilled monoglyceride product made from fully hydrogenated lard with an iodine value in a range from about 0.4 to about 1. Other preferred saturated monoglyceride products include the distilled monoglyceride products made from fats such as tallow, cottonseed oil, soybean oil, peanut oil, sesame oil and the like, which have been fully hydrogenated, the distilled monoglyceride products made from such saturated fatty acids as palmitic acid, stearic acid and the like, and blends of distilled monoglyceride products.

Concentration of the saturated monoglyceride product in a maximum activity condition is generally in a range from about 20 to about 40% by weight of the dispersion with a concentration of about 33% being preferred. Concentrations less than about 20% by weight of the dispersion are within the scope of the broader concepts of this invention but the resulting dispersions are thin and less attractive for use in the baking of bread. Concentrations greater than about 40% by weight of the dispersion are within the broader concepts of this invention, but are generally not desired because the consistency of the dispersion tends to be too great.

Unsaturated monoglycerides are often desired in baked goods because they tend to emulsify water in oil and to thicken cell walls, thus creating a more open grain in baked goods such as bread and cake. Thicker cell walls and more open grain in baked goods give a chewier, old-fashioned, "home-made" texture which has a strong appeal to many people. Consequently, in preferred embodiments of this aqueous dispersion of this invention the monoglyceride composition consists essentially not only of at least one saturated monoglyceride product in a maximum activity condition but also at least one unsaturated monoglyceride product at a concentration sufficient to give to the monoglyceride composition an iodine value greater than 5 and generally in a range from about 20 to about 40. Preferably in such case the dispersion includes triglyceride material.

A preferred unsaturated monoglyceride product is a distilled monoglyceride product made from lard. Other preferred unsaturated monoglyceride products include the distilled monoglyceride products made from fats such as tallow, cottonseed oil, soybean oil, peanut oil, corn oil, sesame seed oil and the like, the distilled monoglyceride products made from such unsaturated fatty acids as oleic acid, linoleic acid and the like, and blends of these distilled monoglyceride products.

Concentration of the unsaturated monoglyceride product in these embodiments of the aqueous dispersion of this invention is generally in a range from about 3 to about 35% by weight of the dispersion with the maximum concentration of the monoglyceride composition (all monoglycerides) being generally about 55% by weight of the dispersion. However, when the iodine value of the unsaturated monoglyceride product is in a range from about 40 to about 75, the weight ratio of saturated monoglyceride product to unsaturated monoglyceride product should be in the neighborhood of about 1.5:1 or the saturated triglyceride content of the triglyceride material should be increased until the dispersion has the desired consistency.

A preferred triglyceride material is lard. Other preferred triglyceride materials include tallow, vegetable oils and partially as well as completely hydrogenated vegetable oils and animal fats.

Concentration of the triglyceride material in these embodiments is dependent on the concentration of the unsaturated monoglyceride product. In general, a weight ratio of triglyceride material to unsaturated monoglyceride product in a range from about 0.15:1 to about 0.5:1 is preferred.

Lecithin is a well known commercial product. Its sole function in the aqueous dispersion of this invention is to maintain the maximum activity condition of the saturated monoglyceride product in the dispersion once that condition has been established therein.

Concentration of lecithin in the aqueous dispersion of this invention in a range from about 0.5 to about 10% by weight of the saturated monoglyceride product is generally sufficient to substantially prolong the maximum activity of the saturated monoglyceride product once the product has been established in a condition of maximum activity. A concentration less than about 0.5% can be employed, but the prolongation effect tends to be too small to be practical. A concentration greater than about 10%, while within the broader aspects of this invention, is not recommended in the more specific aspects of this invention because the effectiveness of the dispersion in bread dough is substantially reduced.

Any good quality potable water can be used in the dispersion of this invention. The water need not be distilled. However, the mineral content of the water should be reasonably low or made so by suitable treatment. Chlorination necessary to assure purification is not harmful.

Concentration of water in the dispersion in general is in a range from about 45 to about 80% by weight of the dispersion. However, greater and lower concentrations are within the concepts of this invention.

Protein material in preferred embodiments of this invention aids in keeping the dispersion in a plastic state and, in particular, decreases the tendency of the dispersion to separate into an oil phase and a water phase when stored at temperatures up to 115° F. Preferred protein material includes skim milk powder, gelatin, egg white, soy flour and the like.

Concentration of protein material in the dispersion of this invention is preferably in a range from about 0.33 to about 6.5% of the dispersion. A concentration greater than about 6.5% can be employed but the consistency of the resulting dispersion tends generally to be too thick for practical use. A concentration less than about 0.33% can be used but the desired effect of the protein material generally tends to become too small to be practical.

Preservatives such as antioxidants (for example, propyl gallate, butylated hydroxy toluene, butylated hydroxy anisole and the like) and metal complexing agents (for example, glycine, phosphoric acid and the like) are preferably employed. Concentrations are conventional, generally being less than 1% by weight of the dispersion.

Preservatives such as mold and bacterial growth inhibitors are particularly recommended. Another one of the problems associated with monoglyceride-water dispersions is mold growth. Besides giving an unattractive product, molds destroy the food emulsifying properties of the dispersion by causing fairly rapid hydrolysis of the monoglyceride portion. Consequently, a mold inhibitor effective enough to prevent mold growth even when inoculated with mold spores is recommended. There are a number of known mold inhibitors which will suffice. These mold inhibitors include the ammonium, alkali metal and alkaline earth metal salts of acetic acid, propionic acid, citric acid, tartaric acid, gluconic acid, sorbic acid and the like. Some specific examples of these mold inhibitors include the sodium, potassium and calcium salts of these acids. A particularly efficacious one is sodium propionate. Concentration of the mold inhibitor in the dispersion of this invention is preferably in a range from about 0.15 to about 5% of the weight of the dispersion, although larger and smaller concentrations are within the concepts of this invention. A particularly satisfactory concentration is about 0.75% of the weight of the dispersion. Generally speaking, for these mold inhibitors to be effective the pH of the water portion of the dispersion should be an acid pH. Recommended is a pH of 4. Not only is mold growth inhibited at this pH, but bacterial growth also appears to be inhibited when protein material such as skim milk powder and bread flour is present. To obtain an acid pH an acid such as acetic acid (which can be in the form of vinegar), lactic acid, phosphoric acid and the like is added to the dispersion in a quantity sufficient to give the desired pH. A particularly preferred acid which appears to have no undesirable effects in the end use of the dispersion is acetic acid.

It is preferred that the density of the aqueous dispersion be established and maintained for storage purposes within a range which is dependent on whether or not an unsaturated monoglyceride product is present at a significant concentration. Too high a density generally results in a wet, rubbery dispersion that is difficult to dilute with water at the time of use under circumstances where a more dilute dispersion is desired. Too low a storage density results in a dispersion which has poor water dilution characteristics.

In these embodiments of the dispersion wherein no significant concentration of unsaturated monoglyceride product is present, the storage density is preferably in a range from about 0.75 to about 0.85, the recommended storage density being about 0.80. At densities in this range the dispersion is readily mixed with the quantity of 20–25° C. water needed to give a saturated monoglyceride product concentration of 6–8% of the diluted dispersion, and the saturated monoglyceride product is still in a maximum activity condition. The desired storage density in this range is achieved by selection of concentrations of components within the disclosed concentration ranges and by dispersing a gas such as, for example, air, carbon dioxide, nitrogen and the like into the dispersion. At the time and place of use, further dilution with water can be effected and, if desired, additional inert gas can be incorporated into the dispersion by admixing with the dispersion gas under superatmospheric pressure and then reducing the ambient pressure to atmospheric.

In those embodiments of the dispersion having a significant concentration of unsaturated monoglyceride product that is, where the iodine value of the monoglyceride composition is greater than 5, the storage density of the dispersion is preferably in a range from about 0.7 to about 0.8 with the recommended storage density being about 0.75. At densities in this range, the dispersion is readily mixed with 20–25° C. water to give diluted dispersions ranging as desired from stable cream-like dispersions to thin milk-like dispersions. Again, the desired storage density in this range is achieved by selection of concentrations of components within the disclosed concentration ranges and by dispersing a gas such as, for example, air, carbon dioxide, nitrogen and the like into the dispersion. At the time and place of use, further dilution with water can be effected and, if desired, additional inert gas can be incorporated into the dispersion by admixing with the dispersion gas under superatmospheric pressure and then reducing the ambient pressure to atmospheric.

The aqueous dispersion of this invention is made by one of two processes depending on whether or not the dispersion is to contain an unsaturated monoglyceride product at a significant concentration.

In the case of those embodiments of the dispersion of this invention, which do not contain an unsaturated monoglyceride product at a significant concentration, and where the monoglyceride composition has at least a monoester content of at least about 80% by weight, the monoglyceride composition and lecithin are admixed with a quantity of water selected to give the desired water concentration, the temperature of at least the monoglyceride composition being in a range from about the melting temperature of the monoglyceride composition to a temperature as much as 60° C. above the gel temperature, and the resulting dispersion is then cooled to 20–25° C. Gel temperature is that temperature at which the oil phase of the dispersion forms a gel when in contact with water. Preferably the admixing is performed at a temperature above the gel temperature and as the mixture cools below the gel temperature mixing action is continued or until after the gel that forms disperses. When gelation occurs in making the dispersion the saturated monoglyceride product in the resulting aqueous dispersion appears to be amorphous and to be maintained in that condition. Most importantly the saturated monoglyceride product appears to to have even greater activity than those saturated monoglyceride products in dispersion made under nongelation conditions. The expression "maximum activity condition" includes the amorphous condition. The dispersion obtained by the gelation procedure, therefore, is most preferred. In the case of those preferred embodiments of the dispersion wherein the iodine value of the monoglyceride composition is less than about 5, the preferred embodiments of the process comprise: blending together at a temperature above the gel temperature of the resulting oil phase monoglyceride composition, lecithin, and the antioxidant and metal complexing components, whereby a liquid oil phase is formed, blending together at about the same temperature the water pH adjusting acid, protein material and mold inhibitor, whereby a water phase is formed, admixing the oil phase and the water phase and continuing the mixing action while cooling the mixture until the gel that forms disperses. Preferably at this point, while the dispersion is still warm, it is vigorously agitated and cooled further along with such air incorporation as may be desired for regulation of the density. Then, it is placed into storage and shipping containers.

In the case of those embodiments of the dispersion which have a significant concentration of unsaturated monoglyceride product, that is, a monoglyceride composition having an iodine value greater than 5, the monoglyceride composition, lecithin and triglyceride material are admixed with a quantity of water selected to give the desired water concentration, the temperature of at least the monoglyceride composition being in a range from the melting point temperature to a temperature less than the gel temperature of the resulting oil phase. The resulting dispersion with the saturated monoglyceride product established in a condition of maximum activity, usually in the alpha phase, is then cooled to 20–25° C. In the case of those preferred embodiments of the dispersion wherein the iodine value of the monoglyceride composition is greater than about 5, the preferred embodiments of the process comprise: blending together at a temperature below the gel temperature of the resulting oil phase but above the melting point of the resulting oil phase the monoglyceride composition, lecithin, triglyceride material, and antioxidant and metal complexing components, whereby a liquid oil phase is formed, blending together at about the same temperature the water, pH adjusting acid, protein material and mold inhibitor, whereby a water phase is formed, vigorously admixing the two phases and cooling while incorporating air, if desired, for regulation of density. The resulting dispersion is then placed into storage and shipping containers.

This invention is further illustrated by the following examples of various aspects thereof, including specific embodiments of the invention. This invention is not limited to the specific embodiments unless otherwise indicated.

EXAMPLES 1–3

These examples llustrate specific embodiments of the aqueous dispersion of this invention, wherein a monoglyceride composition is employed which has an iodine value less than 5.

The formulations of these embodiments are:

| Components | Concentration in Percent by Weight of Dispersion | | |
|---|---|---|---|
| | Ex. 1 | Ex. 2 | Ex. 3 |
| Distilled monoglycerides product from hydrogenated lard | 31.7 | 25.0 | 31.4 |
| Lecithin product | 1.0 | 0.97 | 0.97 |
| Glycerol solution of Glycine (4% by weight of solution) | 0.5 | 0.49 | 0.49 |
| Glycerol solution of Phosphoric acid (30% by weight of solution) | 0.07 | 0.06 | 0.06 |
| Antioxidant | 0.07 | | |
| Water | ¹ 64.85 | ¹ 71.25 | ¹ 64.9 |
| Non-fat, dry milk solids | 1.31 | 1.30 | 1.30 |
| Sodium propionate | 0.25 | 0.24 | 0.24 |
| Glacial acetic acid (to pH of 4) | ¹ 0.25 | ¹ 0.69 | ¹ 0.64 |

¹ Approximate.

A suitable distilled monoglycerides product from hydrogenated lard is one marketed as Myverol Type 18–00 distilled monoglycerides. This commercial product has a monoester content of at least 90.0% by weight and an iodine value of approximately 1. It contains small percentages of antioxidants approved for food use.

A preferred lecithin product available commercially is a dry material containing lecithin at a concentration of 40% by weight, vegetable shortening at a concentration of 10% by weight and milk solids at a concentration of 50% by weight.

A suitable antioxidant is one marked as Tenox 2. It comprises butylated hydroxyanisole (20% by weight), propyl gallate (6% by weight) and citric acid (4% by weight) dissolved in propylene glycol (70% by weight).

The embodiments of the dispersion according to the foregoing formulations are made as follows.

The distilled monoglycerides product, the lecithin product, glycerol solution of glycine and phosphoric acid, and, where indicated, the antioxidant are blended together at 80° C., forming thereby an oil phase. The water, sodium propionate, acetic acid and non-fat dry milk solids are blended together at 20–25° C., forming a water phase. If desired, the water phase can be filtered to remove insoluble material which may be present because of the non-fat, dry milk solids. However, because these solids are for the most part casein, it is not necessary that they be removed. The water phase is heated to 80° C. and then combined with the oil phase in a mixer. A commercial wire whip mixer at low speed operation is suitable for this part of the procedure. Normally a gel forms on contact of the oil phase with the water phase. However, as the mixture cools and is stirred by the whip, the gel usually begins to disperse at about 57° C. Mixing and cooling is continued until the temperature reaches about 52° C. The hot, fluid blend which at this point typically has a density of about 0.75, is passed through a homogenizing machine or a plasticizing machine, such as the well known Votator or Emulsorator machines. The resulting aqueous dispersion is normally discharged from the machine at a temperature of about 40° C.

The specific embodiments of dispersions thus obtained remain typically soft, smooth and moist for as much as four months. The dispersions do not break when subjected to storage at 115° F. The dispersions disperse readily in water and froth when air is passed through the diluted embodiments. Under a microscope at 220 X magnification, the monoglycerides generally appear to be amorphous and over the storage period usually no increase in crystallinity occurs.

Bread baked from bread dough containing these embodiments of the dispersion as emulsifier typically shows improved qualities. These qualities are summarized by a test procedure which results in a bread rating number.

The procedure employed to obtain the bread rating number is as follows.

The bread formula employed in the procedure is a standard commercial formula, to wit:

Sponge

| Components: | Parts by weight |
|---|---|
| Flour | 65 |
| Water | 40.5 |
| Yeast | 1.75 |
| Yeast food | 0.5 |

Dough

| Components: | |
|---|---|
| Flour | 35 |
| Water | 27 |
| Sugar | 6 |
| Salt | 2.25 |
| Milk powder | 4 |
| Shortening | 3.0 |
| Emulsifier | Test level |

The equipment employed in making bread of this formula comprises a Hobart mixer, proofing cabinet and rotating hearth oven. Molding is by hand.

The sponge is prepared with a mix time of 4.5 minutes and a ferment time of 4.5 hours at 87° F. and 80% humidity.

The dough is prepared with a mix time of 9.5 minutes, a floor time of 30 minutes and a proof time of 65 minutes, at 98° F. and 95% humidity.

The bread is baked for 20 minutes at 450° F.

The loaf of bread thus obtained is wrapped in wax paper and stored at a constant temperature of 72° F. and at a 60% relative humidity.

The bread rating number is obtained with the aid of a Baker Compressimeter of the type described in Cereal Laboratory Methods, 5th Ed., 1947, pp. 162–65, compiled and published by the American Association of Cereal Chemists. Five, 1 centimeter thick, spaced slices of the loaf of the bread are selected at random. A Baker Compressimeter reading, the stress in grams required to compress a disk 1.5 inches in diameter 3 millimeters into a 1 centimeter slice of bread, is taken on each slice and the readings are averages. At the same time, a Baker Compressimeter reading is taken on five, 1 centimeter thick, spaced slices of the loaf of control bread, that is, a loaf of bread of the standard formula but without the emulsifier, and averaged. A theoretically perfect average reading is deemed to be 4. The daily test value of the test loaf is calculated in accordance with the equation:

$$\text{Daily test value} = \frac{(C_c - C_t) \times 100}{(C_c - 4.0)}$$

wherein $C_c$ is the compressimeter reading in grams for the control bread and the $C_t$ is the compressimeter reading in grams for the test bread.

The daily test value is obtained for six consecutive days beginning with the second day the test loaf is in storage. The six daily test values thus obtained are averaged, thereby giving the bread rating number.

Under this test procedure a test bread with the same qualities as bread made without emulsifier would have a bread rating number equal to zero. The closer the bread rating number approaches 100, the more effective the emulsifier is in producing the desired qualities in bread.

Bread made with 10 ounces per 100 pounds of flour of a sample of the specific aqueous dispersion of Example 1 after the dispersion had been stored for 32 days gave a bread rating number of 66. Bread made with a sample of the dispersion of Example 1 at a test level of 6 ounces per 100 pounds of flour after the sample had been in storage 41 days gave a bread rating number of 55. These ratings show that the saturated monoglyceride product in the dispersion after these storage times was still in a maximum activity condition.

EXAMPLE 4

This example illustrates a specific embodiment of an aqueous dispersion of this invention, wherein an unsaturated monoglyceride product is also involved.

The formulation of this specific embodiment is:

| Components: | Concentration in percent by weight of dispersion |
|---|---|
| Saturated, distilled monoglycerides product from hydrogenated lard | 25.5 |
| Unsaturated monoglycerides product from lard | 23.5 |
| Lard | 10.0 |
| Lecithin product | 1.0 |
| Antioxidant | 0.5 |
| Glycerol solution of glycine (4% by weight of solution) | 0.5 |
| Glycerol solution of phosphoric acid (30% by weight of solution) | 0.06 |
| Water | 37.78 |
| Skim milk powder | 0.8 |
| Acetic acid | 0.20 |
| Sodium propionate | 0.15 |

A suitable, saturated, distilled monoglycerides product from hydrogenated lard is one marketed as Myverol Type 18–00 distilled monoglycerides. This commercial product is characterized by monoester content of at least 90.0% by weight of the product and an iodine value of 1. It has a clear point of about 73° C.

The unsaturated, distilled monoglycerides product is preferably one marketed as Myverol Type 18–40 distilled monoglycerides. This product has a monoester content of at least 90.0% by weight of the product and an iodine value of 50. It has a clear point of about 60° C.

A satisfactory lecithin product is one marketed as a fluid soybean lecithin product and containing lecithin at a concentration of 65% by weight and soybean oil at a concentration of 35% by weight.

A suitable antioxidant is the commercial product marketed as Tenox II. This product contains a butylated hydroxyanisole (20% by weight), propyl gallate (6% by weight), citric acid (4% by weight) dissolved in propylene glycol (70% by weight).

A dispersion of this formulation is made by combining the distilled monoglyceride products, lard, lecithin product, antioxidant and glycerol solution of glycine and phosphoric acid in a container and liquefying the mixture by heating to 43–46° C. This temperature is below the gel temperature of the resulting oil phase. The sodium propionate is dissolved in the water at 20–25° C., acetic acid is added to obtain the desired pH of 4 and the skim milk powder is stirred in. The resulting water phase and the oil phase are then admixed and the mixing action continued until a smooth dispersion is obtained. Preferably, the admixing is performed in a plasticizer apparatus such as the well known Emulsorator machine. In such a machine the oil phase is passed through the A unit where it is cooled to 43–46° C. The water phase at a temperature of 24° C. is injected into the oil phase just ahead of the first B unit of the machine. Blending of the phases is completed in the second B unit of the machine and there is discharged therefrom a smooth water-in-oil emulsion at a temperature of 32–35° C.

The dispersion thus obtained is typically off-white in color and has the consistency of plasticized shortening. The dispersion can be stored over a temperature range of 40 to 115° F. with no evident change occurring in its physical state or in its function as a food emulsifier. Inspection of a sample of the dispersion under a microscope at 440× magnification in polarized light typically shows a fine, even dispersion. The very few saturated monoglyceride crystals present do not exceed $0.1\mu$ by $2\mu$ in size. No evident change in the state of dispersion occurs typically in the first two months at room temperature storage.

A typical bread rating number obtained when employing at a test level of 6 ounces per 100 pounds of flour a sample of a dispersion according to this formulation after it has been stored one week is 65. A typical bread rating number obtained when employing at the same test level a sample of the dispersion after it has been stored five weeks is 62.

Thus, this invention provides an aqueous dispersion containing a saturated monoglyceride in a maximum activity condition.

Other specific embodiments, advantages and features of this invention will be apparent to those in the exercise of ordinary skill in the art upon reading the foregoing disclosures. In this regard, while specific embodiments of this invention have been described in considerable detail, variations and modifications of these embodiments can be effected without departing from the spirit and scope of the invention as disclosed and claimed.

We claim:

1. An aqueous dispersion comprising (1) a saturated monoglyceride product in a maximum activity condition, the concentration of said saturated monoglyceride product being in a range from about 20 to about 40% by weight of said dispersion, (2) lecithin at a concentration in a range from about 0.5 to about 10% by weight of said saturated monoglyceride product, and (3) water at a concentration in a range from about 45 to about 80% by weight of said dispersion.

2. An aqueous dispersion consisting essentially of (1) a monoglyceride composition having an iodine value less than about 5 and consisting essentially of a saturated monoglyceride product in a maximum activity condition, the concentration of said saturated monoglyceride product being in a range from about 20 to about 40% by weight of said dispersion, (2) lecithin at a concentration in a range from about 0.5 to about 10% by weight of said saturated monoglyceride product and (3) water at a concentration in a range from about 45 to about 80% by weight of said dispersion.

3. An aqueous dispersion comprising (1) a monoglyceride composition having an iodine value less than about 5 and consisting essentially of a saturated monoglyceride product in a maximum activity condition, the concentration of said saturated monoglyceride product being in a range from about 20 to about 40% by weight of said dispersion, (2) lecithin at a concentration in a range from about 0.5 to about 10% by weight of said saturated monoglyceride product, (3) water at an acid pH at a concentration in a range from about 45 to about 80% by weight of said dispersion and (4) mold inhibitor at a concentration in a range from about 0.15 to about 5% of said dispersion.

4. A stable, aqueous dispersion consisting essentially of (1) a monoglyceride composition having an iodine value less than about 5 and consisting essentially of a saturated monoglyceride product in a maximum activity condition, the concentration of said saturated monoglyceride product being in a range from about 20 to about 40% by weight of said dispersion, (2) lecithin at a concentration in a range from about 0.5 to about 10% by weight of said saturated monoglyceride product, (3) protein material at a concentration in a range from about 0.33 to about 6.5% of said dispersion, (4) mold inhibitor at a concentration in a range from about 0.15 to about 5% of said dispersion, and (5) water at an acid pH, the concentration of said water being in a range from about 45 to about 80% by weight of said dispersion.

5. A stable, aqueous dispersion according to claim 1, which comprises dispersed gas at a concentration sufficient to give to said dispersion a density in a range from about 0.75 to about 0.85.

6. An aqueous dispersion consisting essentially of (1) a monoglyceride composition having an iodine value greater than about 5 and consisting essentially of a saturated monoglyceride product in a maximum activity condition and an unsaturated monoglyceride product, the concentration of said saturated monoglyceride product being in a range from about 20 to about 40% by weight of said dispersion, the concentration of said unsaturated monoglyceride product being sufficient to give to said composition said iodine value and being in a range from about 3 to about 35% by weight of said dispersion, and the maximum concentration of said monoglyceride composition being about 55% by weight of said dispersion, (2) triglyceride material at a weight ratio to said unsaturated monoglyceride product in a range from about 0.15:1 to about 0.5:1, (3) lecithin at a concentration in a range from about 0.5 to about 10% by weight of said saturated monoglyceride product, and (4) water at a concentration in a range from about 45 to about 80% by weight of said dispersion.

7. A stable, aqueous dispersion consisting essentially of (1) a monoglyceride composition having an iodine value greater than about 5 and consisting essentially of a saturated monoglyceride product in a maximum activity condition and an unsaturated monoglyceride product, the concentration of said saturated monoglyceride product being in a range from about 20 to about 40% by weight of said dispersion, the concentration of said unsaturated monoglyceride product being sufficient to give to said composition said iodine value and being in a range from about 3 to about 35% by weight of said dispersion, and the maximum concentration of said monoglyceride composition being about 55% by weight of said dispersion, (2) triglyceride material at a weight ratio to said unsaturated monoglyceride product in a range from about 0.15:1 to about 0.5:1, (3) lecithin at a concentration in a range from about 0.5 to about 10% by weight of said saturated monoglyceride product, (4) protein material at a concentration in a range from about 0.33 to about 6.5% by weight of said dispersion, (5) mold inhibitor at a concentration in a range from about 0.15 to about 5% by weight of said dispersion, (6) and water at an acid pH, the concentration of said water being in a range from about 23 to about 80% by weight of said dispersion.

8. A stable, aqueous dispersion according to claim 6, which comprises a dispersed gas at a concentration sufficient to give to said dispersion a density in a range from about 0.7 to about 0.8.

9. A stable, aqueous dispersion which consists essentially of (1) a saturated, distilled monoglycerides product from hydrogenated lard at a concentration of 25.5% by weight of said dispersion, said product being in a maximum activity condition, (2) an unsaturated monoglycerides product from lard at a concentration of 23.5% by weight of said dispersion, (3) lard at a concentration of 10.0% by weight of said dispersion, (4) a lecithin product at a concentration of 1.0% by weight of said dispersion, (5) an antioxidant at a concentration of 0.5% by weight of said dispersion, (6) a 4% glycerol solution of glycine at a concentration of 0.5% by weight of said dispersion, (7) a 30% glycerol solution of phosphoric acid at a concentration of 0.06% by weight of said dispersion, (8) water at a concentration of about 37.78% by weight of said dispersion, (9) skim milk powder at a concentration of 0.8% by weight of said dispersion, (10) acetic acid at a concentration of about 0.20% by weight of said dispersion, and (11) sodium propionate at a concentration of 0.15% by weight of said dispersion.

10. A process for making an aqueous dispersion of a saturated monoglyceride product in a maximum activity condition of substantial duration, which comprises: admixing a saturated monoglyceride product, lecithin and water at a temperature above the melting temperature of said saturated monoglyceride product, whereby said saturated monoglyceride product is established in a maximum activity condition, the quantity of said lecithin being sufficient to substantially prolong said maximum activity condition without substantially adversely affecting the functioning of said saturated monoglyceride product in said condition; and cooling the resulting dispersion.

11. A process for making an aqueous dispersion of a monoglyceride composition consisting essentially of a saturated monoglyceride product in a maximum activity condition of substantial duration, said monoglyceride composition having an iodine value less than about 5, which comprises: admixing said saturated monoglyceride composition, lecithin and water, said water being at an acid pH and containing a mold inhibitor, the temperature at which said admixing is performed being above gel temperature of said monoglyceride composition, whereby said saturated monoglyceride product is established in a condition of maximum activity, the quantity of said lecithin being sufficient to substantially prolong the maximum activity condition of said saturated monoglyceride product without substantially adversely affecting the function of said saturated monoglyceride product in said condition; and then cooling the resulting dispersion.

12. A process for making a stable, aqueous dispersion of a monoglyceride composition consisting essentially of a saturated monoglyceride product in a maximum activity condition of substantial duration, said monoglyceride composition having an iodine value less than about 5, which comprises: blending together at a temperature above the melting temperature of said product said monoglyceride composition and lecithin, whereby an oil phase is formed, blending together water at an acid pH, protein material and mold inhibitor, whereby a water phase is formed; admixing said oil phase and water phase, whereby said dispersion is formed; and cooling said dispersion, the quantities of the components of said dispersion being selected to give a concentration of said saturated monoglyceride product in a range from about 20 to about 40% by weight of said dispersion, a concentration of lecithin in a range from about 0.5 to about 10% by weight of said saturated monoglyceride product, a concentration of protein material in a range from about 0.33 to about 6.5% of said dispersion, a concentration of mold inhibitor in a range from about 0.15 to about 5% of said dispersion, and a concentration of said water a range from about 45 to about 80% by weight of said dispersion.

13. A process according to claim 11 wherein said admixing is in the presence of a gas under mixing conditions selected to disperse said gas in said dispersion.

14. A process for making a stable, aqueous dispersion of a monoglyceride composition consisting essentially of a saturated monoglyceride product in a maximum activity condition of substantial duration and an unsaturated monoglyceride product, said monoglyceride composition having an iodine value greater than about 5, which comprises: blending together at a temperature above the melting temperature of said product but below the gel temperature of the resulting oil phase said monoglyceride composition triglyceride material and lecithin, whereby an oil phase is formed, blending together water at an acid pH, protein material and mold inhibitor, whereby a water phase is formed; admixing said oil phase and water phase, whereby said dispersion is formed; and cooling said dispersion, the quantities of the components of said dispersion being selected to give a concentration of said saturated monoglyceride product in a range from about 20 to about 40% by weight of said dispersion, a concentration of said unsaturated monoglyceride product in a range from about 3 to about 35% by weight of said dispersion, and a concentration of monoglyceride composition up to 55% by weight of said dispersion a weight ratio of triglyceride material to said unsaturated monoglyceride product in a range from about 0.15:1 to about 0.5:1, a concentration of lecithin in a range from about 0.5 to about 10% by weight of said saturated monoglyceride product, a concentration of protein material in a range from about 0.33 to about 6.5% by weight of said dispersion, a concentration of mold inhibitor in a range from about 0.15 to about 5% by weight of said dispersion, and a concentration of said water in a range from about 45 to about 80% by weight of said dispersion.

15. A process according to claim 14 wherein said admixing is in the presence of an inert gas under mixing conditions selected to disperse said gas in said dispersion.

16. An aqueous dispersion in accordance with claim 1 wherein said water is at an acid pH, said dispersion also comprising a mold inhibitor in an amount effective to prevent the growth of mold in said dispersion.

17. An aqueous dispersion in accordance with claim 16 wherein said water contains at least one acid selected from the group consisting of acetic, lactic and phosphoric.

18. An aqueous dispersion in accordance with claim 16 wherein said mold inhibitor is sodium propionate.

19. An aqueous dispersion comprising (1) a monoglyceride composition having an iodine value greater than about 5 and comprising a saturated monoglyceride product in a maximum activity condition and an unsaturated monoglyceride product, the concentration of said saturated monoglyceride product being in a range from about 20 to about 40% by weight of said dispersion, the concentration of said unsaturated monoglyceride product being sufficient to give to said composition said iodine value and being in a range from about 3 to about 35% by weight of said dispersion, (2) lecithin at a concentration in a range from about 0.5 to about 10% by weight of said saturated monoglyceride product, and (3) water at a concentration in a range from about 45 to about 80% by weight of said dispersion.

20. An aqueous dispersion in accordance with claim 19 wherein said water is at an acid pH, said dispersion also comprising a mold inhibitor in an amount effective to prevent the growth of mold in said dispersion.

21. A process for making a stable, aqueous dispersion of a monoglyceride composition comprising a saturated monoglyceride product in a maximum activity condition of substantial duration and an unsaturated monoglyceride product, said monoglyceride composition having an iodine value greater than about 5, which comprises: blending together at a temperature above the melting temperature of said products said monoglyceride composition, lecithin, water at an acid pH, and mold inhibitor, whereby said dispersion is formed; and cooling said dispersion, the quantities of the components of said dispersion being selected to give a concentration of said saturated monoglyceride product in a range from about 20 to about 40% by weight of said dispersion, a concentration of said unsaturated monoglyceride product in a range from about 3 to about 35% by weight of said dispersion, and a concentration of monoglyceride composition up to 55% by weight of said dispersion, a concentration of lecithin in a range from about 0.5 to about 10% by weight of said saturated monoglyceride product, a concentration of mold inhibitor in a range from about 0.15 to about 5% by weight of said dispersion, and a concentration of said water in a range from about 45 to about 80% by weight of said dispersion.

References Cited

UNITED STATES PATENTS

| 2,681,281 | 6/1954 | Kuhrt | 99—163 |
| 2,932,574 | 4/1960 | Bour | 99—118 |
| 3,111,409 | 11/1963 | Jackson et al. | 99—91 |
| 3,144,399 | 8/1964 | Dalby et al. | 99—91 |
| 3,180,736 | 4/1965 | Landfried | 99—91 |

FOREIGN PATENTS

| 250,027 | 10/1962 | Australia. |
| 701,697 | 12/1953 | Great Britain. |

LIONEL M. SHAPIRO, *Primary Examiner.*

JOSEPH M. GOLIAN, *Examiner.*